United States Patent
Tourné

(10) Patent No.: US 7,428,364 B2
(45) Date of Patent: *Sep. 23, 2008

(54) BENDING AN OPTICAL FIBER INTO A BACKPLANE

(76) Inventor: Joseph A.A.M. Tourné, 5709 MA, Helmond (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/714,756

(22) Filed: Mar. 6, 2007

(65) Prior Publication Data

US 2007/0154160 A1    Jul. 5, 2007

Related U.S. Application Data

(63) Continuation of application No. 11/501,613, filed on Aug. 9, 2006, now Pat. No. 7,187,839, which is a continuation of application No. 11/348,923, filed on Feb. 6, 2006, now Pat. No. 7,095,939, which is a continuation of application No. 10/924,460, filed on Aug. 23, 2004, now abandoned, which is a continuation of application No. 10/618,786, filed on Jul. 14, 2003, now Pat. No. 6,782,181, which is a continuation of application No. 10/179,756, filed on Jun. 25, 2002, now Pat. No. 6,594,435.

(60) Provisional application No. 60/300,878, filed on Jun. 26, 2001.

(51) Int. Cl.
*G02B 6/00* (2006.01)

(52) U.S. Cl. .................. 385/136; 385/134; 385/137; 385/139

(58) Field of Classification Search .......... None
See application file for complete search history.

(56) References Cited

U.S. PATENT DOCUMENTS

| 4,515,434 A | 5/1985 | Margolin et al. |
| 4,678,264 A | 7/1987 | Bowen et al. |
| 4,744,629 A | 5/1988 | Bertoglio et al. |
| 5,233,677 A | 8/1993 | Winslow |
| 5,452,393 A | 9/1995 | Stowe et al. |
| 5,475,779 A | 12/1995 | Uken et al. |
| 5,530,787 A | 6/1996 | Arnett |
| 5,949,946 A | 9/1999 | Debortoli et al. |

(Continued)

FOREIGN PATENT DOCUMENTS

DE    195 31 633 A1    7/1997

(Continued)

*Primary Examiner*—Tina M Wong
(74) *Attorney, Agent, or Firm*—Gallop, Johnson & Neuman

(57) ABSTRACT

A method of connecting an optical fiber to a backplane with a right angle bend mount. The bend mount includes a base and a cover that is pivotably connected to the base by a hinge. A clamp is formed by a first pair of opposed surfaces of the base and cover adjacent the hinge. This clamp fixedly grips a ferrule portion of the optical fiber when the base and the cover are closed together. A second pair of opposed surfaces of the base and cover forms another clamp. This clamp fixedly grips a non-ferrule portion of the optical fiber when the base and the cover are closed together. A bent portion of the optical fiber between the ferrule portion and the gripped non-ferrule portion is disposed in a nongripping gap between the base and the cover when the base and the cover are closed together.

4 Claims, 2 Drawing Sheets

U.S. PATENT DOCUMENTS

| | | |
|---|---|---|
| 6,116,791 A | 9/2000 | Laninga et al. |
| 6,229,942 B1 | 5/2001 | Engberg et al. |
| 6,402,389 B1 | 6/2002 | Steijer et al. |
| 6,422,761 B1 | 7/2002 | Naghski et al. |
| 6,594,435 B2 | 7/2003 | Tourne |
| 2002/0039476 A1 | 4/2002 | Sauve et al. |
| 2002/0097973 A1 | 7/2002 | Petri |
| 2002/0136520 A1 | 9/2002 | Janus et al. |

FOREIGN PATENT DOCUMENTS

| | | |
|---|---|---|
| EP | 0 533 496 A1 | 3/1993 |
| EP | 0 677 756 A2 | 10/1995 |
| EP | 0 753 772 A2 | 1/1997 |
| EP | 0 992 819 A1 | 4/2000 |
| GB | 2 069 175 A | 8/1981 |
| WO | WO 94/25886 A1 | 11/1994 | ic printed circuit boards. More particularly, the present invention relates to integration of a fiber management system into a backplane printed circuit board via a right angle bend mount.

BENDING AN OPTICAL FIBER INTO A BACKPLANE

CROSS REFERENCE TO RELATED APPLICATIONS

This application is a continuation of Ser. No. 11/501,613, filed on Aug. 9, 2006 now U.S. Pat. No. 7,187,839, which is a continuation of Ser. No. 11/348,923, filed on Feb. 6, 2006, now U.S. Pat. No. 7,095,939, which is a continuation of Ser. No. 10/924,460, filed on Aug. 23, 2004, now abandoned, which is a continuation of U.S. Ser. No. 10/618,786, filed on Jul. 14, 2003, now U.S. Pat. No. 6,782,181, issued on Aug. 24, 2004, which is a continuation of U.S. Ser. No. 10/179,756, filed Jun. 25, 2002, now U.S. Pat. No. 6,594,435, which claims priority to the provisional patent application identified by the U.S. Ser. No. 60/300,878, filed Jun. 26, 2001, of which the entire content of each application is hereby expressly incorporated by reference.

FIELD OF THE INVENTION

The present invention relates generally to the field of opto-electronic printed circuit boards. More particularly, the present invention relates to integration of a fiber management system into a backplane printed circuit board via a right angle bend mount.

BACKGROUND OF THE INVENTION

Optical fiber as used in standard telecommunications and other applications is based upon the principles of Snell's Law and total internal reflection. Each fiber is made up of a central core and an outer layer known as the cladding. By establishing a core with an index of refraction (n) higher that the index of refraction of the cladding, the light will totally reflect internally rather than passing through the core and being lost.

Optical fiber connectors are made possible through the employment of a device known as a ferrule. This device supports and aligns the fiber allowing for a precise coupling of one fiber to another when the connection is made. In the case of a single fiber connector, the ferrule is a cylindrically shaped structure, often ceramic, which holds the fiber in its center with the aid of a cured epoxy resin. The end of the fiber and the ferrule are polished to create an optically smooth, large planar surface with the optical fiber aligned as close as possible to the center of the device. When two keyed ferrules are aligned end to end through a mechanical connector, optical coupling takes place between the two fibers allowing the optical connection to be made. Often, the joining ferrule surfaces are not orthogonal in order to reduce unwanted reflection.

Multiple fiber connectors employ a ferrule that is generally rectangular in shape with grooves or holes allowing for precise alignment of a plurality of fibers. These fibers are supported in a single, parallel array, separated by 250 microns on center.

It is desirable to interface optical fibers and optical fiber arrays with a printed circuit board so that they lay along the surface of the board and then bend into the board so that they form a right angle with the surface of the board. Optical fiber as used in standard telecommunications and other applications is limited by its physical structure in its ability to make a right angle transition. Physically bending the fiber at such a right angle may cause strain that leads to fractures and structural imbalances in the fiber material. Repeated flexing of fibers bent in such a way exacerbates the failure risk.

Thus, what is needed is a way to make an abrupt right angle bend of an optical fiber or fiber array into a printed circuit board in a manner that is stable and prevents repeated flexing.

SUMMARY OF THE INVENTION

It is an object of the present invention to bend an optical fiber to create a back panel/circuit-pack interface.

It is another object of the present invention to effect bending of an optical fiber into a backplane panel by mounting the fiber-array and guiding it with a molding shaped and dimensioned so that the stress on the fiber is minimized and radius of the bend fiber is maximized.

It is yet another object of the present invention to provide a right angle bend mount that easily mounts to a printed circuit board.

It is still another object of the present invention to provide a right angle bend mount having an easy locking V-groove structure.

It is a further object of the present invention to provide a right angle bend mount that mounts in a backpanel with automatic orientation.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

The present invention pertains to electro-optical backplane systems that employ optical fibers. The present invention is applicable for any fiber (single mode, multimode, polymer fiber) provided that the fiber can physically make a small bend radius with acceptable loss. The type of application (i.e., frequency range used) determines, in part, the loss in the system. The most useful fibers for this system are those that allow for a small bend radius. An exemplary embodiment of the present invention is a right angle bend mount for bending an optical fiber into the plane of a circuit board. This right angle bend mount includes a base and a cover that is pivotably connected to the base by a hinge. A clamp is formed by a first pair of opposed surfaces of the base and cover adjacent the hinge. This clamp fixedly grips a ferrule portion of the optical fiber when the base and the cover are closed together. A second pair of opposed surfaces of the base and cover forms another clamp. This clamp fixedly grips a ferrule portion of the optical fiber when the base and the cover are closed together. The ferrule portion of the optical fiber is held at a right angle to the gripped non-ferrule portion of the optical fiber when the base and the cover are fixed together in a closed position. A bent portion of the optical fiber between the ferrule portion and the gripped non-ferrule portion is disposed in a nongripping gap between the base and the cover when the base and the cover are closed together.

According to an exemplary embodiment a fiber management system (or "FMS") is terminated with a ferrule (single or array). The illustrated exemplary embodiment uses an array type "MT" connector. The fiber type used in the FMS also determines, in part, the loss in the system as it will be bent in a radius of about 8-10 mm. Fibers with high differences' in a refraction index or doping are useful to keep the losses low.

Figure 1:
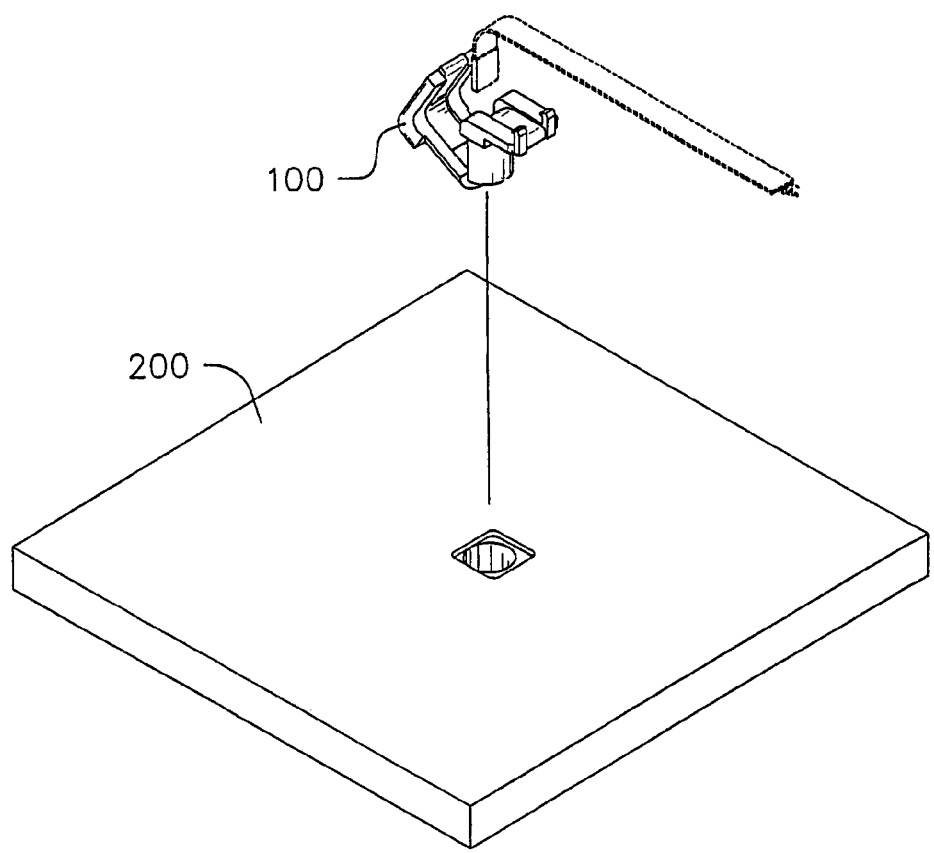
FIG. 1 illustrates a perspective exploded view of a right angle mount according to an embodiment of the present invention.

Referring to FIG. 1, the MT connector (shown in phantom) is illustrated mounted in a right angle mount (or molding) 100. The mount 100 guides and holds the fibers of the FMS in position to prevent signal distortion. The mount 100 is shaped in way such that it can be locked and fixed into the backplane 200.

Figure 2:
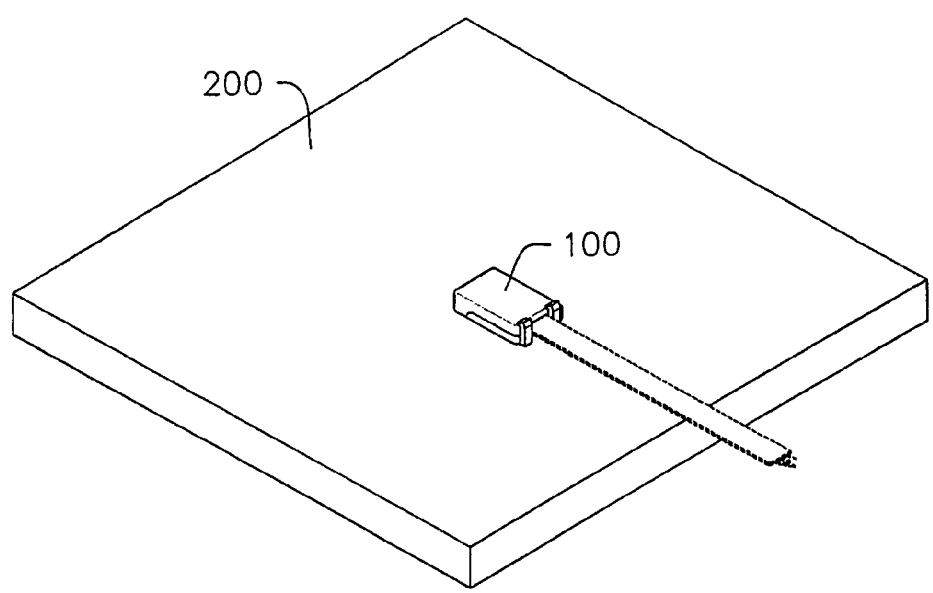
FIG. 2 illustrates a perspective view of the right angle mount of FIG. 1, assembled with a fiber array and embedded in a backplane.

Referring to FIG. 2, a perspective view of the right angle mount 100 of FIG. 1 is illustrated, assembled with a fiber array and embedded in a backplane 200. In this view, the mount 100 is shown locked and fixed into the backplane 200. The MT fiber array is shown in phantom.

Figure 3:
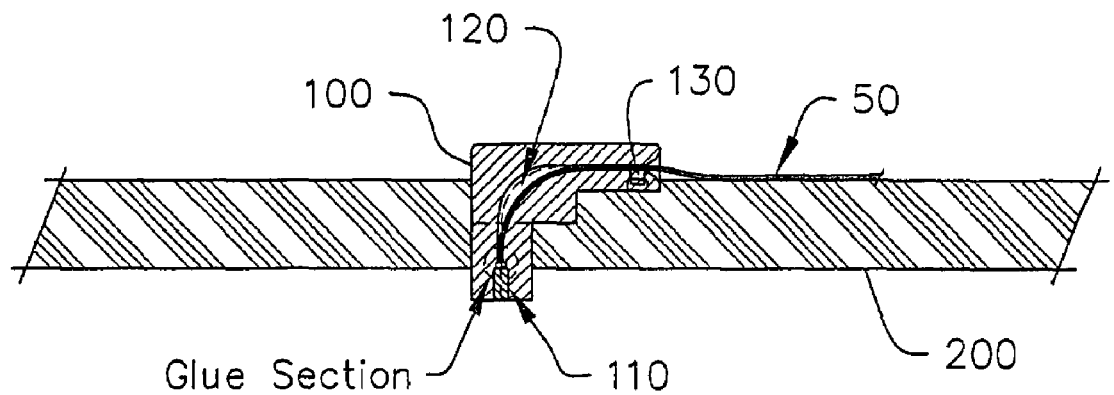
FIG. 3 illustrates a sectional elevation view of the right angle mount of FIG. 1, assembled with a fiber array and embedded in a backplane.

Referring to FIG. 3, a sectional elevation view of the right angle mount 100 of FIG. 2 is illustrated, assembled with a fiber array and embedded in a backplane 200. A silicon V-groove structure 110 helps to hold the MT fiber array 50 in place. A gap 120 is formed inside the mount 100 to provide extra space that permits some variance in how the fiber array 50 bends inside the mount 100. Snap connectors 130 hold the mount 100 in a closed position.

Figure 4:
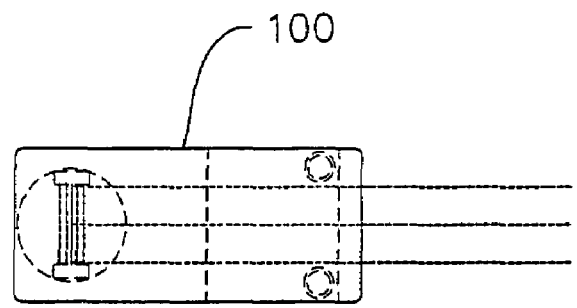
FIG. 4 illustrates a plan view of the right angle mount of FIG. 1.

Referring to FIG. 4, a plan view of the right angle mount 100 of FIG. 2 is illustrated.

The manufacturing method of how to aligned and mount the fiber connector/fiber array connector into the backplane is considered novel and, due to its simplicity, cost-effective. The exemplary embodiment uses component that are either readily available or easy to manufacture. The main element is a molded mount for PCB mounting.

This concept illustrated by the exemplary embodiment separates traditional backplane manufacturing from backplanes that are truly integratable with an optical fiber management system.

One advantage of PCB manufacturing using the exemplary embodiment is that expensive components for the optical circuitry are not lostlscrapped in the case of a defect electrical circuit due to a manufacturing failure. The system is modular and parts may be exchanged or saved in the manufacturing process, thus saving money. The present invention has been described in terms of an exemplary embodiment, however, it will be appreciated that various modifications and improvements may be made to the described embodiment without departing from the scope of the invention.

What is claimed is:

1. A method of preparing an optical fiber for connection to a backplane having an opening, the optical fiber having a ferrule portion and a non-ferrule portion, the method comprising:

positioning the optical fiber between a base with two clamp surfaces and a cover pivotally connected to the base and having two clamp surfaces; and moving the base and the cover to a closed position to grip the ferrule portion of the optical fiber between opposed clamp surfaces of the base and the cover and to grip the non-ferrule portion of the optical fiber between opposed surfaces of the base and the cover such that the ferrule portion is held at a non-zero angle to the gripped non-ferrule portion.

2. The method of claim 1 wherein a bent portion of the optical fiber is disposed in a non-gripping gap between the base and the cover when the base and the cover are the closed position.

3. A method of preparing an optical fiber for connection to a backplane having an opening, the optical fiber having a ferrule portion and a non-ferrule portion, the method comprising:

positioning the optical fiber between a base with two clamp surfaces joined by an integral right angled portion and a cover connected to the base and having two clamp surfaces joined by an integral right angled portion; and moving the base and the cover to a closed position to grip the ferrule portion of the optical fiber between opposed clamp surfaces of the base and the cover and to grip the non-ferrule portion of the optical fiber between opposed surfaces of the base and the cover such that the ferrule portion is held at a right angle to the gripped non-ferrule portion.

4. The method of claim 3, wherein a bent portion of the optical fiber is disposed in a non-gripping gap between the base and the cover when the base and the cover are the closed position.

* * * * *